US010767902B2

(12) United States Patent
Coggins

(10) Patent No.: US 10,767,902 B2
(45) Date of Patent: Sep. 8, 2020

(54) ELECTRIC RESISTANCE RADIANT FURNACE WITH MESH, SCREEN, OR HONEYCOMB BETWEEN PANEL EMITTERS

(71) Applicant: Allen W. Coggins, St. Clair, MO (US)

(72) Inventor: Allen W. Coggins, St. Clair, MO (US)

(73) Assignee: Thermasi LLC, St. Clair, MO (US)

( * ) Notice: Subject to any disclaimer, the term of this patent is extended or adjusted under 35 U.S.C. 154(b) by 1137 days.

(21) Appl. No.: 14/941,321

(22) Filed: Nov. 13, 2015

(65) Prior Publication Data

US 2017/0138635 A1    May 18, 2017

(51) Int. Cl.
*F24H 3/02*    (2006.01)
*H05B 3/28*    (2006.01)

(52) U.S. Cl.
CPC .............. *F24H 3/022* (2013.01); *H05B 3/283* (2013.01); *H05B 2203/003* (2013.01); *H05B 2203/022* (2013.01); *H05B 2203/032* (2013.01); *Y02B 30/26* (2013.01)

(58) Field of Classification Search
CPC ........ H05B 2203/003; H05B 2203/022; H05B 2203/032; H05B 3/283; F24H 3/022; F24H 3/04; F24H 3/06; F24H 3/08; F24H 3/10; F24H 3/062; Y02B 30/26; B60H 2001/00128
USPC ........ 392/435, 349; 219/391, 395, 396, 399, 219/420, 422, 424, 418
See application file for complete search history.

(56) References Cited

U.S. PATENT DOCUMENTS

| | | | | |
|---|---|---|---|---|
| 2,396,190 A | * | 3/1946 | Morgan | A62B 21/00 |
| | | | | 392/488 |
| 4,425,792 A | * | 1/1984 | Kohama | G01F 1/69 |
| | | | | 73/204.27 |
| 4,541,410 A | | 9/1985 | Jatana | |
| 4,544,380 A | * | 10/1985 | Itou | B01D 50/006 |
| | | | | 95/210 |
| 4,595,826 A | * | 6/1986 | Duran | H05B 3/66 |
| | | | | 219/400 |
| 5,355,841 A | * | 10/1994 | Moore, Jr. | F23D 14/145 |
| | | | | 122/18.31 |

(Continued)

FOREIGN PATENT DOCUMENTS

WO    WO-2014153134 A1 *  9/2014    ......... A47J 37/0807

Primary Examiner — Tu B Hoang
Assistant Examiner — Diallo I Duniver
(74) Attorney, Agent, or Firm — The Ollila Law Group LLC

(57) ABSTRACT

An electric resistance radiant furnace that includes multiple panel emitters and at least one layer of metallic screen located between the panel emitters. In some embodiments, the panel emitters each include a ceramic body with an electric resistance wire embedded therein. Furnaces can be for heating an occupied space within a building and can also include a blower and controls and heat produced by electricity passing through the wire can be conducted through the ceramic body of each panel emitter and at least part of the heat can be radiated from the ceramic body to the metallic screen and then be transferred to air blown by the blower between the panel emitters and along the metallic screen. Concave or convex surfaces of curved layers of metallic screen can face opposite directions, can face the panel emitters, or both.

11 Claims, 1 Drawing Sheet

(56) References Cited

U.S. PATENT DOCUMENTS

| | | | |
|---|---|---|---|
| 5,435,716 A * | 7/1995 | Joyce | F24H 1/205 |
| | | | 431/7 |
| 5,910,267 A | 6/1999 | Stricker | |
| 5,948,301 A * | 9/1999 | Liebermann | A47J 39/006 |
| | | | 219/395 |
| 6,021,775 A | 2/2000 | Dempsey et al. | |
| 7,351,939 B2 * | 4/2008 | Boyle | A47J 37/0857 |
| | | | 219/386 |
| 7,568,908 B2 | 8/2009 | Potter | |
| 7,967,669 B2 | 6/2011 | Baik | |
| 2004/0045949 A1 * | 3/2004 | McWilliams | F24C 7/06 |
| | | | 219/393 |
| 2010/0239724 A1 * | 9/2010 | Veltrop | A47J 37/08 |
| | | | 426/240 |

* cited by examiner

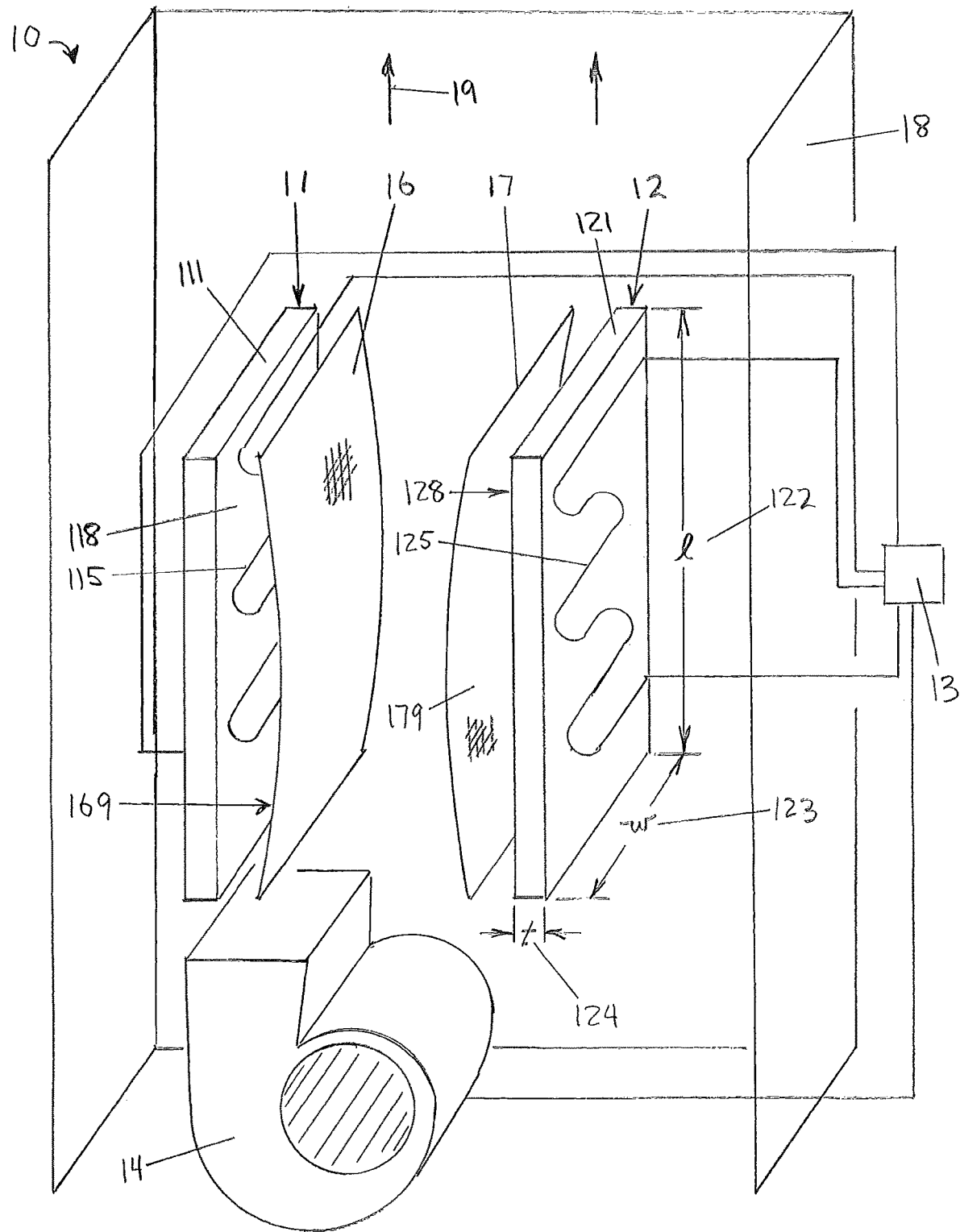

ELECTRIC RESISTANCE RADIANT FURNACE WITH MESH, SCREEN, OR HONEYCOMB BETWEEN PANEL EMITTERS

FIELD OF THE INVENTION

Various embodiments of this invention relate to electric resistance radiant furnaces, for example, for heating an occupied space within a building.

BACKGROUND OF THE INVENTION

Various heating devices have been used for heating buildings, for example, in residential and commercial applications, including fuel burning and electric furnaces. There are a variety of gas heating units, and electric heating furnaces, as examples, that are readily available upon the market that provide ample heat. In addition, there are a large number of infrared space heaters that are useful within a room to provide single space heating, that are readily available. Electric resistance heaters have been used that utilize electric resistance wire to convert electrical energy into heat energy. In the past, however, the heat has typically been transferred directly from the electric resistance wire into the air that is being heated, and since the surface area of the wire has typically been fairly small, as the radiant surface was typically limited to the wire only, the wire has had to be very hot in order to transfer the desired amount of heat to the air. Very hot wires have, among other things, burned dust and debris in the air and created vapors and caused odors in the air heated by the furnace. Room for improvement exists over the prior art in a variety of areas that may be apparent to a person of ordinary skill in the art having studied this document.

SUMMARY OF PARTICULAR EMBODIMENTS OF THE INVENTION

This invention provides, among other things, electric resistance radiant furnaces, for example, for heating an occupied space within a building. Various embodiments include panel emitters, for example, having a ceramic body and an electric resistance wire. A number of embodiments include at least one layer of meta metallic mesh, wire screen, or honeycomb assembly, for instance, located between multiple panel emitters. Certain aspects of the embodiments address limitations and flaws in the prior art. Various embodiments provide, for example, as an object or benefit, that they partially or fully address or satisfy one or more of the needs, potential areas for benefit, or opportunities for improvement known in the art, as examples. Various embodiments spread out the heat with a heat sink before the heat is transferred to the air that is being heated.

Specific embodiments of the invention include various electric resistance radiant furnaces, for example, for heating an occupied space within a building. In a number of embodiments, for instance, such an electric resistance radiant furnace includes a blower, panel emitters, controls, and at least one layer of metallic mesh, wire screen, or honeycomb assembly, for example, located between the multiple panel emitters. In various such embodiments, each panel emitter includes a ceramic body and an electric resistance wire through which electricity passes. In a number of embodiments, for example, the electric resistance wire is embedded within the ceramic body. Further, in various embodiments, the controls operate the blower, the multiple panel emitters, or, in many embodiments, both.

Still further, in many such embodiments, heat produced by each panel emitter is conducted through the ceramic body of each panel emitter and at least part of the heat produced by each panel emitter is radiated from the ceramic body to the at least one layer of metallic mesh, wire screen, or honeycomb assembly. Even further, in various embodiments, the blower blows air between the multiple panel emitters and along the at least one layer of metallic mesh, wire screen, or honeycomb assembly and at least part of the heat produced by each panel emitter is transferred to the air between the multiple panel emitters.

In some embodiments, the panel emitters or the body thereof has certain relative proportions, which, in particular embodiments, are oriented in a particular manner. In some embodiments, for example, the ceramic body of each of the multiple panel emitters includes an overall length, an overall width that is perpendicular to the overall length, and an overall thickness that is perpendicular to the overall length and perpendicular to the overall width. Further, in a number of such embodiments, the overall length is at least two times the overall thickness and the overall width is at least two times the overall thickness. Still further, in various such embodiments, the overall length of at least two of the multiple panel emitters are substantially parallel, the overall width of the at least two of the multiple panel emitters are substantially parallel, the overall thickness of the at least two of the multiple panel emitters are substantially parallel, or a combination thereof.

Further, in some embodiments, there is more than one layer of metallic mesh, wire screen, or honeycomb assembly. In some embodiments, for example, the at least one layer of metallic mesh, wire screen, or honeycomb assembly includes at least two layers of the metallic mesh or the wire screen. Even further, in some embodiments, the metallic mesh, wire screen, or honeycomb assembly has a particular shape. In particular embodiments, for example, the at least one layer of metallic mesh, wire screen, or honeycomb assembly is curved. Further still, in some embodiments, the metallic mesh, wire screen, or honeycomb assembly is oriented in a particular, manner relative to the panel emitters. For example, in certain embodiments, the at least one layer of metallic mesh, wire screen, or honeycomb assembly includes a concave or convex side facing at least one of the multiple panel emitters.

Even further still, as another example, in particular embodiments, the at least one layer of metallic mesh, wire screen, or honeycomb assembly includes at least two layers of metallic mesh or wire screen, each of the at least two layers of metallic mesh or wire screen is curved, and each of the at least two layers of metallic mesh or wire screen includes a concave or convex side facing one of the multiple panel emitters. Moreover, in certain embodiments, the concave or convex side of each of two of the at least two layers of metallic mesh, wire screen, or honeycomb assembly face in substantially opposite directions. Still further, in some embodiments, the at least two of the multiple panel emitters each includes an inner side facing another panel emitter (e.g., an other of the at least two of the multiple panel emitters), and in particular embodiments, each inner side is defined by the overall width and the overall length (i.e., of the body or panel).

Other specific embodiments of an electric resistance radiant furnace include panel emitters and two layers of metallic mesh, wire screen, or honeycomb assembly and the panel emitters have a particular shape and orientation with respect to the mesh, screen, or honeycomb. In many such embodiments, the multiple panel emitters each include a ceramic body and an electric resistance wire through which electricity passes to produce heat, and in various embodiments, the electric resistance wire is embedded within the ceramic body (e.g., similar to as previously described). Further, in a number of embodiments, the two layers of metallic mesh, wire screen, or honeycomb assembly are specifically located between the multiple panel emitters. Moreover, in various embodiments, the ceramic body of each of the multiple panel emitters includes an overall length, an overall width that is perpendicular to the overall length, and an overall thickness that is perpendicular to the overall length and perpendicular to the overall width. Still further, in a number of such embodiments, the overall length is at least two times the overall thickness, the overall width is at least two times the overall thickness, or both. Even further, in various such embodiments, the overall length of at least two of the multiple panel emitters are substantially parallel, the overall width of the at least two of the multiple panel emitters are substantially parallel, and the overall thickness of the at least two of the multiple panel emitters are substantially parallel.

In many such embodiments, the at least two layers of metallic mesh, wire screen, or honeycomb assembly are each curved. Further, in some such embodiments, each of the two layers of metallic mesh, wire screen, or honeycomb assembly includes a concave or convex side, for example, facing different ones of the multiple panel emitters. Still further, in various embodiments, the at least two layers of metallic mesh, wire screen, or honeycomb assembly each includes a concave or convex side facing one of the multiple panel emitters. Even further, in some embodiments, the concave or convex side of each of the two layers of metallic mesh, wire screen, or honeycomb assembly face in substantially opposite directions. Further still, in certain embodiments, two of the multiple panel emitters each includes an inner side facing the other panel emitter (e.g., an other of the two of the multiple panel emitters). Even further still, in particular embodiments, each inner side is defined by the overall width and the overall length.

Moreover, in various embodiments, the two layers of metallic mesh, wire screen, or honeycomb assembly each includes metallic mesh, or the two layers of metallic mesh, wire screen, or honeycomb assembly each includes wire screen, or each includes honeycomb assembly. Further, in some such embodiments, the electric resistance radiant furnace further includes a blower and controls that operate the blower and the multiple panel emitters. Still further, similar to embodiments previously described, in many embodiments, heat produced by the electric resistance wire of each panel emitter is conducted through the ceramic body of each panel emitter and at least part of the heat produced by the electric resistance wire of each panel emitter is radiated from the ceramic body to at least one of the two layers of metallic mesh, wire screen, or honeycomb assembly. Further still, in a number of embodiments, the blower blows air between the multiple panel emitters and along the two layers of metallic mesh, wire screen, or honeycomb assembly and the at least part of the heat produced by the electric resistance wire of each panel emitter is transferred to the air between the multiple panel emitters.

Still other specific embodiments include electric resistance radiant furnaces that each include multiple substantially parallel flat electric resistance panel emitters and two curved layers of metallic mesh, wire screen, or honeycomb assembly located between the multiple substantially parallel flat electric resistance panel emitters. In a number of such embodiments, each of the at least two curved layers of metallic mesh, wire screen, or honeycomb assembly includes a concave or convex side, for example, facing one of the multiple substantially parallel flat electric resistance panel emitters. In addition, various other embodiments of the invention are also described herein, and various benefits of certain embodiments may be apparent to a person of ordinary skill in the art.

BRIEF DESCRIPTION OF THE DRAWINGS

FIG. 1 is a cross-sectional view in orthographic projection of an example of an electric resistance radiant furnace having at least two panel emitters.

The drawing illustrates, among other things, an example of one embodiment. Various embodiments may include aspects shown in the drawing, described in the specification (including the claims), known in the art, or a combination thereof, as examples. Other embodiments, however, may differ.

DETAILED DESCRIPTION OF EXAMPLES OF EMBODIMENTS

This patent application describes, among other things, examples of certain embodiments, and certain aspects thereof. Other embodiments may differ from the particular examples described in detail herein. Various embodiments are or concern electric resistance radiant furnaces, for example, for heating an occupied space within a building. Various embodiments include at least one layer of metallic mesh, wire screen, or honeycomb assembly, for example, located between multiple panel emitters. In a number of embodiments, the furnace is installed in duct work within the building. In some embodiments, the duct work may be used for air conditioning when not being used for the furnace, the furnace may be combined with an air conditioning unit, or both.

Various embodiments utilize ceramic electric infrared radiant panel emitters (e.g., 11 and 12 shown in FIG. 1). In a number of embodiments, at least one heat sink is provided, for example, between or enveloping the panels, and in many embodiments, the heat sink (e.g., 16, 17, or both) is in the form of a mesh, screen, honeycomb, or heat absorbing metallic or ceramic material, for example, that allows air to flow through it, so that the heat generated within the heat sink is transferred to the passing air (e.g., 19) to carry and conduct it into the room or building (e.g., to heat a home). In some embodiments, panel emitters are of a low-amperage capacity, resulting in low-amperage consumption. Various controls (e.g., 13) may be part of or used in conjunction with the furnace (e.g., 10) to provide time delays, control temperature, etc. In some embodiments, thermostatic and time delay controls may be used in conjunction with a furnace, for example, that allow for the buildup of the heat within the heat sink that surrounds or parallels the radiant panel emitters, for example, so that the blower (e.g., 14) does not come on until there is sufficient heat available. In some embodiments, a thermostat may turn off the blower when sufficient heat has been transferred and the temperature of the heat sink has been reduced below effective heat transferring capacity.

Many embodiments include a casing (e.g., 18), such as a metal casing, a blower (e.g., 14) within a structure, and a mount that holds a plurality of (e.g., infrared) panel emitters (e.g., 11 and 12) in association with the blower. A number of embodiments incorporate a heat sink, for example, in the form of a metallic mesh, wire screen, or honeycomb assembly (e.g., 16, 17, or both), that is provided between or surrounding the panel emitters and, in a number of embodiments, in parallel with the panel emitters. In some embodiments, a housing (e.g., 18) for the system is structured such that it will be compatible and fit with the existing ductwork of any home, so as to conveniently replace a gas or electric furnace which may have been previously installed and used within the facility. Furthermore, in some embodiments, a furnace of this type may be used and connected in combination with the grid, or be used in an off grid application. In some embodiments, the furnace (e.g., 10) can be multipositional. In some such embodiments, it can provide for up flow, horizontal delivery of heated air (e.g., 19), or provide for a down flow of the heated air, or a combination thereof.

A number of embodiments include a series of infrared ceramic panel emitters (e.g., 11 and 12), that are mounted upon a mounting plate. In some embodiments, the panels are surrounded by a heat sink, or have a heat sink therebetween which is made of a metallic mesh, wire screen, or honeycomb assembly (e.g., 16 and 17) that is capable of absorbing heat generated from the panels during the operations of the unit (e.g., 10). In different embodiments, the heat sink may be made of one of various types of material that are capable of absorbing heat, such as the metallic mesh, wire screen, or honeycomb assembly. In some embodiments, the heat sink is located surrounding the entire series of panel emitters within the unit, and in other embodiments, the heat sink (e.g., 16 and 17) is between the panels. Various types of mass, that is capable of absorbing heat, but at the same time allows the passage of blower air therethrough, can be used as the heat sink for particular embodiments. The size of the panel emitters (e.g., 11 and 12) used within the heater can depend upon the capacity of heat desired to be generated, and can be determined, size wise, and capacity wise, by the amount of BTUs that are desired to be generated from the heating unit, during its operations. In addition, the capacity of the heating unit will also be considered from the standpoint of what type of amperage is desired to be consumed, and therefore, the lower the BTU generated from the unit, the lower the amperage that will be consumed during its functioning.

In different embodiments, a squirrel cage or other type of supply fan (e.g., 14) can be used, which may be operated at a fixed speed, or variable speed, and the fan and panel emitters can be controlled by controls (e.g., 13), that may include a thermostat, in a number of embodiments, that provide for the controlled operations of the device (e.g., furnace 10). One or more of various types of filters may be located within the structure of the cabinet and filter the air, for example, as it enters or exits the blower and is passed through the heat sink and panel emitters. Various types of racks may be used for holding the filter or filters in place. Some embodiments further include a cooling coil when the furnace is also to function as an air conditioner for providing cooling to the room or building in which it is located. Further, some embodiments include more than one set of panel emitters, for example, depending upon the amount of heat required for the room or building to be heated.

In some embodiments, a return conduit may convey some of the heated air that the heating unit has heated for re-circulating some of the heated air to provide for further heating to provide higher temperature air, lower humidity, or other conditioning before it is conveyed by ductwork or piping to a room or other location within the building. In some embodiments, the heating unit has a short cycle air pass that takes the heated air and mixes it with the return air, so as to effectively raise the temperature of the return air, brought back by the blower, and forced through the cabinet end through the panel heat sinks, to assure that the air reaches the temperature desired for its return and delivery back to the room during functioning. These can be effectively thermostatically or time controlled. In various embodiments, electrical controls regulate the operations of the heating unit, during its functioning. For example, in some embodiments, one or more thermostats turn on and shutoff of the heating units (e.g., panel emitters and blower) based on temperature in the occupied space. In some embodiments, the controls also control activation of cooling coils to provide for the chilling of the air and its transfer by ductwork into the room or building in which the unit operates.

In some embodiments, panel emitters are mounted within the unit, secured to their mounting plates, and located by the heat sink. Various heating units can be built of modularized segments so the components can be shipped as individual units and then stacked or added to the overall unit when it is assembled at a customer's location. Where more heat may be needed, additional units, such as 2, 3, or 4, can be added. Where an air-conditioning unit and its cooling coils are provided, there may be additional air-conditioning units that may be added as well in order to meet demand.

Various embodiments include a (e.g., low amperage) residential and commercial radiant heating unit (e.g., 10), including cabinetry (e.g., 18), a series of electric infrared radiant panel emitters (e.g., 11 and 12) provided therein, said panels being mounted upon a mounting plate, a metallic or mass heat sink (e.g., 16, 17, or both), for example, between, surrounding, or paralleling the panel emitters and mounting plates to absorb the heat generated by the panel emitters during operations of the unit, a blower (e.g., 14) provided within the cabinetry (e.g., in proximity with the panel emitters), to provide forced air movement through the heat sink proximate the panel emitters for passage through ductwork or piping and delivery to a space of a building being heated.

In some embodiments, there are at least a pair of mounting plates, and electric infrared ceramic radiant panel emitters (e.g., 11 and 12) having a thickness of at least ¼" of ceramic with desired mass are provided upon each mounting plate to provide for additional heating of the air for delivery (e.g., via the blower) to the building to be warmed. Further, certain embodiments, include a cooling coil, for example, provided upon the top of the cabinetry, above the heating unit, to provide for cooling of the air to furnish delivery of chilled air to the building, when the heating units are turned off. In particular embodiments, there are thermostatic controls, time controls, or both (e.g., 13), provided for regulating the operations of the heating unit, the cooling coils, or both, for example, in response to the ambient temperature to be either heated, or cooled, depending upon the atmospheric conditions of the building.

FIG. 1 illustrates an example of an electric resistance radiant furnace, furnace 10, for example, for heating an occupied space within a building. In the embodiment shown, furnace 10 heats the occupied space (not shown) by heating air 19 that is delivered to the space. In the embodiment shown, furnace 10 includes blower 14 that moves the air, panel emitters 11 and 12, and layers of metallic mesh or wire screen 16 and 17 within cabinet or housing 18. Furnace 10 also includes controls 13 which are shown outside of housing 18, but in some embodiments, some or all of the controls are located inside the housing. In many embodiments that include a thermostat (e.g., as part of the controls), the thermostat can be external to the housing of the furnace. In some embodiments, there is a different housing for the blower. In some such embodiments, for example, different numbers (e.g., 1, 2, 3, or 4) of housings for the heating element can be attached (e.g., in series) to a blower housing depending on the amount of heat that is needed for the particular application. In some embodiments, different modules that make up a furnace can be shipped separately so they will be easier to ship and more manageable prior to assembly.

Further, in some embodiments, a larger number of panel emitters can be energized when the furnace is first turned on, and some of the panels can be turned off once the mass of panel emitters and heat sink is at a desired temperature. In different embodiments, the blower (e.g., 14) can be a single speed, two speed, or variable speed fan, as examples, and can be an axial flow fan or a radial flow or centrifugal fan, as examples. In various embodiments, supply and return ductwork (not show) can be connected to the housing (e.g., 18). Furnace 10 is an example of a furnace that includes multiple panel emitters (e.g., 11 and 12) and at least one layer of metallic mesh, wire screen, or honeycomb assembly (e.g., layers 16 and 17 shown). Further in the embodiment illustrated, layers 16 and 17 of metallic mesh or wire screen are located between or surrounding panel emitters 11 and 12.

In this particular embodiment, each of the multiple panel emitters 11 and 12 include a ceramic body (i.e., 111 and 121) and an electric resistance wire (i.e., 115 and 125) through which electricity passes to produce heat. In the embodiment show, the electric resistance wire (e.g., 115 and 125) is embedded within the (e.g., non-electrical conducting) ceramic body (e.g., 111 and 121) having a desired mass. Further, in the embodiment shown, controls 13 operate blower 14 and panel emitters 11 and 12. In various embodiments, the controls (e.g., 13) turn the blower (e.g., 14) on and off, adjust the speed of the blower, turn the panel emitters (e.g., 11 and 12) on and off, or a combination thereof, for example, in response to a thermostat that can be part of the controls.

In many embodiments, heat produced by electricity passing through the electric resistance wire (e.g., 115, 125, or both) of each panel emitter (e.g., 11, 12, or both) is conducted through the ceramic body (e.g., 111, 121, or both) of each panel emitter and at least part of the heat produced by the electric resistance wire of each panel emitter is radiated (e.g., via infra red radiation) from the ceramic body to the at least one layer of metallic mesh, wire screen, or honeycomb assembly (e.g., 16, 17, or both). Even further, in various embodiments, the blower (e.g., 14) blows air between the multiple panel emitters (e.g., 11 and 12) and along e.g., and through) the at least one layer of metallic mesh, wire screen, or honeycomb assembly (e.g., layers 16 and 17 in the embodiment illustrated) and at least part of the heat produced by the electric resistance wire of each panel emitter is transferred (e.g., via convection) to the air between the multiple panel emitters. In some embodiments, since the ceramic body is larger than the electrical resistance wire, the ceramic body is not as hot and, among other things, does not produce as much odor or vapors as prior art furnaces where a hot wire was exposed directly to the air that is being heated.

In some embodiments, the panel emitters (e.g., 11 and 12) or the body thereof (e.g., 111, 121, or both) have certain relative proportions, which, in particular embodiments, are oriented in a particular manner. In the embodiment shown, for example, ceramic body 121 of panel emitter 12 includes overall length l or 122, overall width w or 123 that is perpendicular to overall length l or 122, and overall thickness t or 124 that is perpendicular to overall length l or 122 and perpendicular to overall width w or 123. Further, in the embodiment shown, overall length l or 122 is at least two times overall thickness t or 124 and overall width w or 123 is at least two times overall thickness t or 124. In a number of such embodiments, the overall length is at least 2, 3, 4, 5, 6, 7, 8, 9, 10, or 12 times the overall thickness and the overall width is at least 2, 3, 4, 5, 6, 7, 8, 9, 10, or 12 times the overall thickness, as other examples.

In the embodiment illustrated, panel emitter 11 has the same overall dimensions as panel emitter 12 and ceramic body 111 has the same overall dimensions as body 121. Other embodiments, however, may differ. Still further, in various embodiments, the overall length of (e.g., at least two of) the multiple panel emitters are substantially parallel, the overall width of the (e.g., at least two of the) multiple panel emitters are substantially parallel, the overall thickness (e.g., of the at least two of the) multiple panel emitters are substantially parallel, or a combination thereof. As used herein, "substantially", when referring to an angle (e.g., parallel, perpendicular, opposite, etc.), means to within 10 degrees. In the embodiment illustrated, the overall length (e.g., l or 122 shown for panel emitter 12) of panel emitters 11 and 12 are substantially parallel, the overall width (e.g., w or 123 shown for panel emitter 12) of panel emitters 11 and 12 are substantially parallel, and the overall thickness (e.g., t or 124 shown for panel emitter 12) of panel emitters 11 and 12 are substantially parallel.

In the embodiment depicted, there is more than one layer of metallic mesh, wire screen, or honeycomb assembly. Specifically, in the embodiment shown, the at least one layer of metallic mesh, wire screen, or honeycomb assembly includes two layers 16 and 17 of the metallic mesh or the wire screen. Some embodiments include a honeycomb assembly in place or, or in addition to, the metallic mesh or the wire screen. Various embodiments include at least two layers of the metallic mesh, the wire screen, or the honeycomb assembly. Some embodiments, for example, include 3, 4, 5, or 6 layers of the metallic mesh, the wire screen, or the honeycomb assembly, as other examples. Even further, in some embodiments, the metallic mesh, the wire screen, or the honeycomb assembly has a particular shape, particular density, or both. In the embodiment illustrated, for example, layers 16 and 17 of metallic mesh or wire screen are curved (e.g., in the shape of part of a circle). In different embodiments, the metallic mesh, the wire screen, or the honeycomb assembly are curved in two dimensions (e.g., as shown) or in three dimensions, and may form a circle, sphere, or other shape, as another example. Further still, in some embodiments, the metallic mesh, the wire screen, or the honeycomb assembly is oriented in a particular manner relative to the panel emitters. For example, in the embodiment shown, layer 16 of metallic mesh or wire screen includes concave side 169 facing panel emitter 11, layer 16 of metallic mesh or wire screen includes an opposite convex side facing panel emitter 12 and layer 17 of metallic mesh or wire screen, layer 17 of metallic mesh or wire screen includes concave side 179 facing panel emitter 12, and layer 17 of metallic mesh or wire screen includes an opposite convex side facing panel emitter 11 and layer 16 of metallic mesh or wire screen. As a further example, should centrally-located panel emitters be added to the embodiment illustrated (i.e., between layers 16 and 17), then layer 16 of metallic mesh or wire screen would include concave side 169 facing panel emitter 11, layer 16 of metallic mesh or wire screen would include an opposite convex side facing a centrally-located panel emitter, layer 17 of metallic mesh or wire screen would include concave side 179 facing panel emitter 12, and layer 17 of metallic mesh or wire screen would include an opposite convex side facing a centrally-located panel emitter.

In the embodiment shown, the at least one layer of metallic mesh, wire screen, or honeycomb assembly includes two layers 16 and 17 of metallic mesh or wire screen, each of which is curved, and each of which includes a concave side (e.g., 169 and 179) facing one of the multiple panel emitters (i.e., concave side 169 faces panel emitter 11 and concave side 179 faces panel emitter 12). Moreover, in certain embodiments, the concave side of each of two of the at least two layers of metallic mesh, wire screen, or honeycomb assembly face in substantially opposite directions, and in the embodiment depicted, concave sides 169 and 179 face substantially opposite directions.

Still further, in some embodiments, the (e.g., at least two of the) multiple panel emitters each includes an inner side facing another panel emitter (e.g., an other of the at least two of the multiple panel emitters), and in particular embodiments, each inner side is defined by the overall width and the overall length (i.e., of the body or panel). In the embodiment shown, panel emitters 11 and 12 include inner sides 118 and 128, respectively, facing another panel emitter (i.e., each other). Further still, in the embodiment shown, each inner side is defined by the overall width and the overall length (i.e., of the body or panel). For example, inner side 128 of panel emitter 12 is defined by overall width w or 123 and overall length l or 122 in the embodiment illustrated in FIG. 1. Moreover, in various embodiments, the (e.g., two) layers of metallic mesh, wire screen, or honeycomb assembly (e.g., 16 and 17) each include metallic mesh, or the two layers of metallic mesh, wire screen, or honeycomb assembly each include wire screen, or the two layers of metallic mesh, wire screen, or honeycomb assembly each include honeycomb assembly. In different embodiments, one or more layers of metallic mesh, wire screen, or honeycomb assembly include metallic mesh only, include wire screen only, include a honeycomb assembly only, include both metallic mesh and wire screen, include both metallic mesh and a honeycomb assembly, include wire screen and a honeycomb assembly, or include all of a metallic mesh, wire screen, and honeycomb assembly. Further in other embodiments, where metallic mesh, wire screen, or honeycomb assembly are indicated herein, another material may be used, for example, a porous material. One example is a porous ceramic material. Different embodiments, however, can use a different material.

Still other specific embodiments include electric resistance radiant furnaces that each include multiple substantially parallel flat electric resistance panel emitters and two curved layers of metallic mesh, wire screen, or honeycomb assembly located between the multiple substantially parallel flat electric resistance panel emitters. In the embodiment illustrated, for example, electric resistance radiant furnace 10 includes multiple substantially parallel flat electric resistance panel emitters 11 and 12 and two curved layers of metallic mesh or wire screen 16 and 17 located between the multiple substantially parallel flat electric resistance panel emitters 11 and 12. Further, in a number of embodiments, each of the two curved layers of metallic mesh, wire screen, or honeycomb assembly includes a concave side, for example, facing one of the multiple substantially parallel flat electric resistance panel emitters. In the embodiment shown, for example, each of the two curved layers 16 and 17 of metallic mesh or wire screen includes a concave side, for example, sides 169 and 179, each facing one of the multiple substantially parallel flat electric resistance panel emitters, namely, panels 11 and 12.

Other embodiments include four panel emitters, for example, arranged in a square, so that each panel faces another opposite panel and so that adjacent panels are oriented 90 degrees apart. In a similar example, the panels are arranged in a rhombus or diamond shape instead of a square, for instance, with acute angles between 60 and 90 degrees, or in some embodiments, between 75 and 90 degrees. Still another example includes four (e.g., flat) panel emitters that are all parallel and in a row, with two panel emitters in the center, two panel emitters on the sides, and at least one (e.g., two) layers of metallic mesh, wire screen, or honeycomb assembly between the first and second panel emitter and at least one (e.g., two) (e.g., additional) layers of metallic mesh, wire screen, or honeycomb assembly between the third and fourth panel emitter. In some such embodiments, there are two curved layers of metallic mesh, wire screen, or honeycomb assembly in each location with concave sides facing in opposite directions, facing two of the panel emitters, or both. In various embodiments, each panel emitter has a corresponding layer of metallic mesh, wire screen, or honeycomb assembly, for instance, that includes a concave side, for example, facing the corresponding one of the (e.g., four, for instance, flat) electric resistance panel emitters. The embodiment illustrated in FIG. 1 is one example having two panel emitters 11 and 12. Still other embodiments include 3, 4, 5, 6, 7 or 8 panel emitters, as other examples.

Further, various embodiments of the subject matter described herein include various combinations of the structure, components, and features described herein, shown in the drawings, or that are known in the art. Moreover, certain procedures can include acts such as manufacturing, obtaining, or providing components that perform functions described herein or in the documents that are incorporated by reference. The subject matter described herein also includes various means for accomplishing the various functions or acts described herein, or that are apparent from the structure and acts described. Each function described herein is also contemplated as a means for accomplishing that function, or where appropriate, as a step for accomplishing that function.

Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. An electric resistance radiant furnace that accepts an air flow, for heating an occupied space within a building, the electric resistance radiant furnace comprising:
   multiple panel emitters, each panel emitter comprising a solid ceramic body and an electric resistance wire through which electricity passes to produce heat, wherein the electric resistance wire is embedded within the solid ceramic body, so to not be exposed to the air flow;
   a blower; and
   at least two curved metallic screens located between the multiple panel emitters, wherein the at least two curved metallic screens each comprise a concave side facing a corresponding panel emitter;

a thermostat connected to the electric resistance wires and the blower;

wherein:

heat produced by electricity passing through the electric resistance wire of each panel emitter is conducted from within the ceramic body of each panel emitter;

at least part of the heat produced by the electric resistance wire of each panel emitter is radiated from the ceramic body to the at least two curved metallic screen;

wherein the electric resistance radiant furnace is configured such that the air flow flows between the multiple panel emitters and along the at least two curved metallic-screens;

wherein the multiple panel emitters are oriented substantially parallel to a direction of the air flow;

wherein the at least two curved metallic screens are oriented substantially parallel to the direction of the air flow from the blower;

the at least part of the heat produced by the electric resistance wire of each panel emitter is transferred to the air between the multiple panel emitters; and wherein the thermostat is configured to allow for a buildup of heat proximate the panel emitter by controlling the turning on of one or more panel emitters, and wherein the blower does not blow air until a predetermined amount of heat from the metallic screens is available.

2. The electric resistance radiant furnace of claim 1 wherein each of the at least two curved metallic screens comprises at least one of a metallic mesh, and a wire screen.

3. The electric resistance radiant furnace of claim 1 wherein the ceramic body of each of the multiple panel emitters comprises an overall length, an overall width that is perpendicular to the overall length, and an overall thickness that is perpendicular to the overall length and perpendicular to the overall width, wherein the overall length is at least two times the overall thickness and the overall width is at least two times the overall thickness, and wherein the overall length of at least two of the multiple panel emitters are substantially parallel, the overall width of the at least two of the multiple panel emitters are substantially parallel, and the overall thickness of the at least two of the multiple panel emitters are substantially parallel.

4. The electric resistance radiant furnace of claim 3 wherein: the concave or convex side of each of the at least two curved metallic screens face in substantially opposite directions.

5. The electric resistance radiant furnace of claim 3 wherein: the at least two of the multiple panel emitters each comprises an inner side facing an other of the at least two of the multiple panel emitters, wherein each inner side is defined by the overall width and the overall length.

6. An electric resistance radiant furnace that accepts an air flow, the electric resistance radiant furnace comprising:

a blower;

multiple panel emitters, each panel emitter comprising a ceramic body and an electric resistance wire through which electricity passes to produce heat, wherein the electric resistance wire is embedded within the ceramic body, so to not be exposed to the air flow;

at least two curved metallic screens located between the multiple panel emitters, wherein the at least two curved metallic screens each comprise a concave side facing a corresponding panel emitter;

wherein:

the ceramic body of each of the multiple panel emitters comprises an overall length, an overall width that is perpendicular to the overall length, and an overall thickness that is perpendicular to the overall length and perpendicular to the overall width;

the overall length is at least two times the overall thickness;

the overall width is at least two times the overall thickness;

the overall length of at least two of the multiple panel emitters are substantially parallel;

the overall width of the at least two of the multiple panel emitters are substantially parallel;

the overall thickness of the at least two of the multiple panel emitters are substantially parallel;

wherein the multiple panel emitters are oriented substantially parallel to a direction of the air flow;

wherein the at least two curved metallic screens are oriented substantially parallel to the direction of the air flow;

a thermostat connected to the electric resistance wires and the blower;

and wherein the thermostat is configured to allow for a buildup of heat proximate the multiple panel emitters by controlling the turning on of one or more panel emitters and wherein the blower does not blow air until a predetermined amount of heat from the metallic screens is available.

7. The electric resistance radiant furnace of claim 6 wherein:

two of the multiple panel emitters each comprises an inner side facing another of the two of the multiple panel emitters, wherein each inner side is defined by the overall width and the overall length.

8. The electric resistance radiant furnace of claim 6 wherein the at least two curved metallic screens each comprise wire screen.

9. The electric resistance radiant furnace of claim 6 further comprising:

a blower; and controls that operate the blower and the multiple panel emitters.

10. The electric resistance radiant furnace of claim 9 further wherein:

heat produced by the electric resistance wire of each panel emitter is conducted from within the ceramic body of each panel emitter;

at least part of the heat produced by the electric resistance wire of each panel emitter is radiated from the ceramic body to at least one of the two curved metallic screen;

the blower blows air between the multiple panel emitters and along the two curved metallic screen; and the at least part of the heat produced by the electric resistance wire of each panel emitter is transferred to the air between the multiple panel emitters.

11. An electric resistance radiant furnace that accepts an air flow, the electric resistance radiant furnace comprising:

A blower;

multiple substantially parallel flat electric resistance panel emitters each comprising a solid ceramic body and an electric resistance wire through which electricity passes to produce heat, wherein a majority of the electric resistance wire is embedded within the solid ceramic body so to not be exposed to the air flow;

two curved layers of metallic screen located between the multiple substantially parallel flat electric resistance panel emitters, wherein the two curved layers of metallic screen each comprise a concave side facing a corresponding panel emitter; and wherein the multiple substantially parallel flat electric resistance panel emitters are oriented substantially parallel to a direction of the air flow;

wherein the two curved layers of metallic screens are oriented substantially parallel to the direction of the air flow; and wherein a thermostat is configured to allow for a buildup of heat proximate the multiple panel emitters by controlling the turning on of one or more panel emitters, and wherein the blower does not blow air until a predetermined amount of heat from the metallic screens is available.

* * * * *